United States Patent
Brown

(10) Patent No.: US 7,631,435 B2
(45) Date of Patent: Dec. 15, 2009

(54) BRICKLAYING METHOD AND APPARATUS FOR PLUMBING CONTROL JOINTS

(76) Inventor: Patrick Brown, 10 Riverwatch La., Indian Head, MD (US) 20640

( * ) Notice: Subject to any disclaimer, the term of this patent is extended or adjusted under 35 U.S.C. 154(b) by 0 days.

(21) Appl. No.: 11/848,752

(22) Filed: Aug. 31, 2007

(65) Prior Publication Data

US 2008/0168672 A1    Jul. 17, 2008

Related U.S. Application Data

(60) Provisional application No. 60/842,165, filed on Sep. 5, 2006.

(51) Int. Cl.
*G01C 15/10* (2006.01)
(52) U.S. Cl. ............... 33/404; 33/407; 33/410; 33/518; 52/749.13
(58) Field of Classification Search ........... 33/404–410, 33/353, 354, 370, 371, 374–376, 391, 392, 33/397, 196, 197, 518; 52/749.12–749.14, 52/747.12, 126.1, 126.2, 243, 379, DIG. 1
See application file for complete search history.

(56) References Cited

U.S. PATENT DOCUMENTS

| | | | | |
|---|---|---|---|---|
| 2,534,940 | A * | 12/1950 | Arnold | 33/518 |
| 2,873,529 | A * | 2/1959 | Hogan et al. | 404/61 |
| 3,173,211 | A * | 3/1965 | Williams | 33/332 |
| 3,250,009 | A * | 5/1966 | Oseka | 33/404 |
| 6,293,066 | B1 * | 9/2001 | Lohrey | 52/396.08 |
| 6,430,826 | B1 * | 8/2002 | Sigl | 33/408 |
| 6,857,234 | B2 * | 2/2005 | Goudreau et al. | 52/243 |
| 7,320,181 | B2 * | 1/2008 | Charpentier | 33/407 |

* cited by examiner

*Primary Examiner*—Amy Cohen Johnson
(74) *Attorney, Agent, or Firm*—Ronald E. Greigg

(57) ABSTRACT

The invention relates generally to plumbing control joints in masonry walls, and apparatus for plumbing a control joint in a brick wall surface. A mounting bracket supports a bracket rod and cylindrical collar which may slide axially along and pivot about the bracket rod. The plumb rod is slidably received in an adjustable holding member. The plumb rod is then secured relative to the holding member. A spirit level is fixed within a circular bore of the holding member, which can be adjusted to the user's desired position. To ensure the plumb rod is perpendicular to level ground, the holding member is pivoted until the spirit level indicates the desired result and the position is secured. A plumb control joint is guaranteed by successively laying the brick layers against the plumb rod in a manner which is typically known in the art.

3 Claims, 4 Drawing Sheets

BRICKLAYING METHOD AND APPARATUS FOR PLUMBING CONTROL JOINTS

CROSS REFERENCE TO RELATED APPLICATION

This application is based on Provisional Application 60/842,165 filed on Sep. 5, 2006.

BACKGROUND OF THE INVENTION

The present invention relates generally to plumbing control joints in masonry walls, and more particularly to a method and apparatus for plumbing a control joint in a brick wall. Bricks are laid typically to form an outer building surface and during the process of laying bricks it is common to space vertical gaps periodically in the brickwork. These gaps are known in the art as control joints as they control cracks from forming in masonry walls by relieving stresses within the wall. Brick walls are subject to cracking for many reasons such as temperature or shrinkage induced changes or load stresses. Regardless of the reason, cracks must be controlled to maintain moisture resistance and appearance. Control joints allow segments of a structure to move independently of each other while retaining the integrity of the structure. A common type of control joint that is utilized in masonry walls comprises a vertical "seam" that separates horizontally adjacent sections of masonry material (e.g., brick). The thickness and placement of the control joint will vary depending upon the type of wall, climate, etc. The resulting wall is in essence, two independent wall sections separated by a thin vertical seam. The seam may be filled with foam plastic and later covered by caulking on the exterior surface. The outer surface of the brick wall is referred to in the art as the "brick skin." While the use of control joints improves the stability of a structure, their use creates new challenges for the masons laying the brick. In particular, as the wall is being erected, the mason must ensure that each control joint is plumb, i.e., at a right angle to level ground. Failure to properly plumb each control joint may compromise the building structure and the appearance of the brick skin. Given the widespread use of control joints, the process of precisely installing control joints can add a substantial amount skill, time and cost skill to a project. Accordingly, a need exists for a low cost device that will facilitate the process of plumbing control joints in a masonry structure.

SUMMARY OF THE INVENTION

The invention is directed to an apparatus for plumbing a control joint in a masonry wall. The apparatus includes a plumb rod which is held in a desired position relative to a control joint in a wall by a holding member. A mounting bracket affixes the plumb rod holding member to the wall in order to position the plumb rod in the control joint of the wall. A level is attached to the plumb rod holding member for plumbing the plumb rod with respect to the desired position, for example ensuring that the plumb rod is vertical with respect to level ground. The plumb rod holding member includes at least one adjusting mechanism which allows for adjustment of the vertical, horizontal, and pivotal position of the plumb rod relative to the mounting bracket. The position of the plumb rod is secured to the holding member by at least one securing mechanism.

The adjusting mechanism is embodied by a first positioning mechanism connected between the mounting member and the plumb rod. The first positioning mechanism enables horizontal adjustment of the plumb rod relative to the mounting member. The adjusting mechanism is further embodied by a second positioning mechanism connected between the mounting member and the plumb rod. The second positioning mechanism enables pivotal and vertical adjustment of the plumb rod relative to the mounting member.

The first positioning mechanism is embodied by a mounting rod fixed horizontally to the mounting member and a sliding collar slidingly engaged with the mounting rod. The second positioning mechanism is embodied by an extension rod extending radially outward from the mounting member and a plumb rod holding member slidingly engaged with the extension rod.

The plumbing member is mounted on the second positioning mechanism of the plumb rod holding member. The invention features a calibration mechanism of the plumbing members for calibrating the plumbing member to ensure a true ninety degree plumb between the plumb rod and the desired position.

The invention further encompasses a method for plumbing a control joint in a masonry wall. The plumb rod is held in a desired position relative to a control joint in a wall by a plumb rod holding member. The plumb rod holding member is affixed to the wall on a mounting bracket. The plumb rod is made plumb relative to the desired position by a level attached to the holding member. During this step, the position of the plumb rod can be adjust vertically, horizontally, and pivotally relative to the mounting member as desired. The position of the plumb rod is then secured relative to the holding member, and the plumb rod is used to align successive layers of bricks along the control joint.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENT

Figure 1:
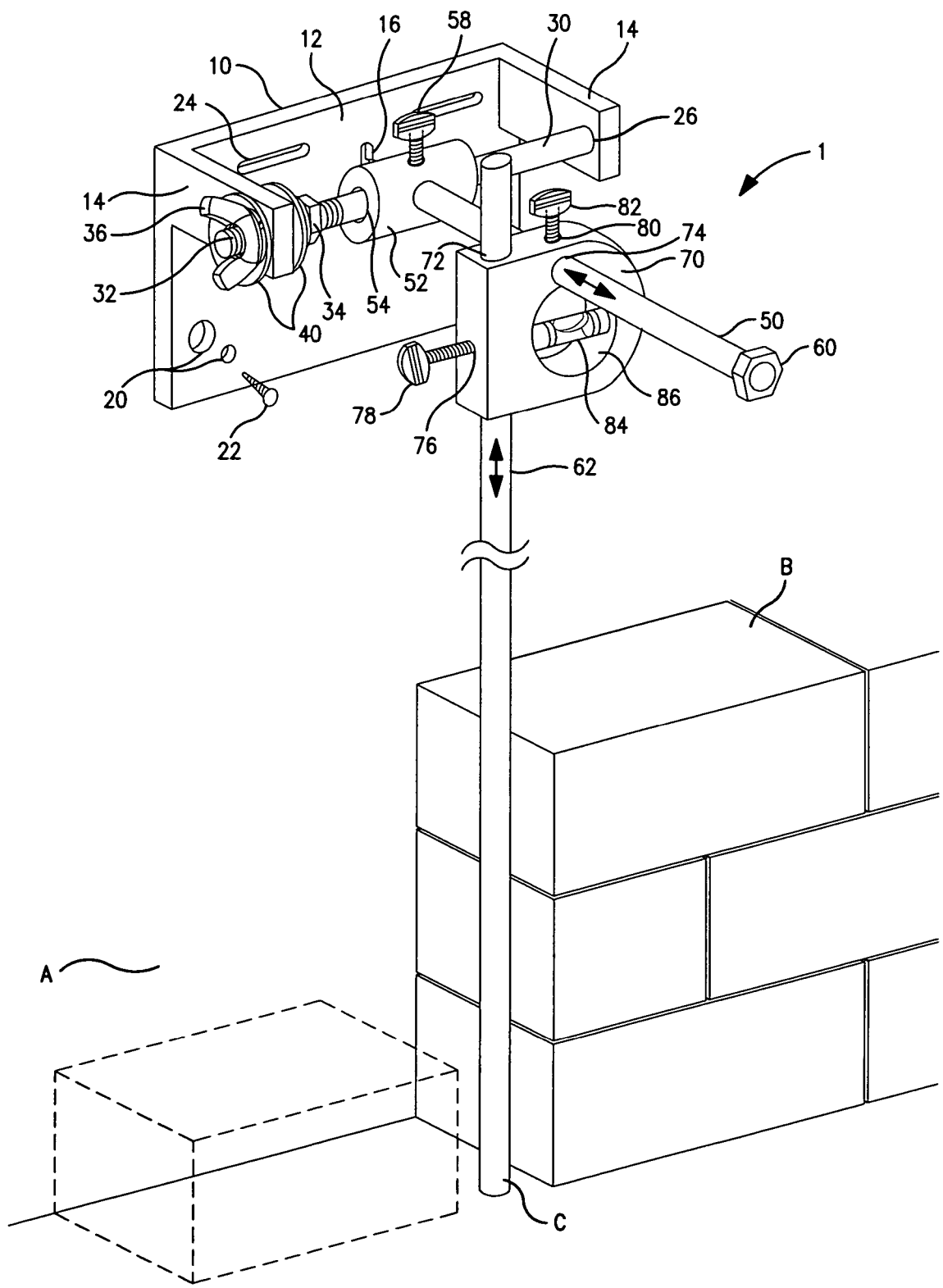
FIG. 1 is a perspective view of an assembled apparatus for plumbing control joints according to a preferred embodiment the invention being utilized in a first application.
Figure 2:
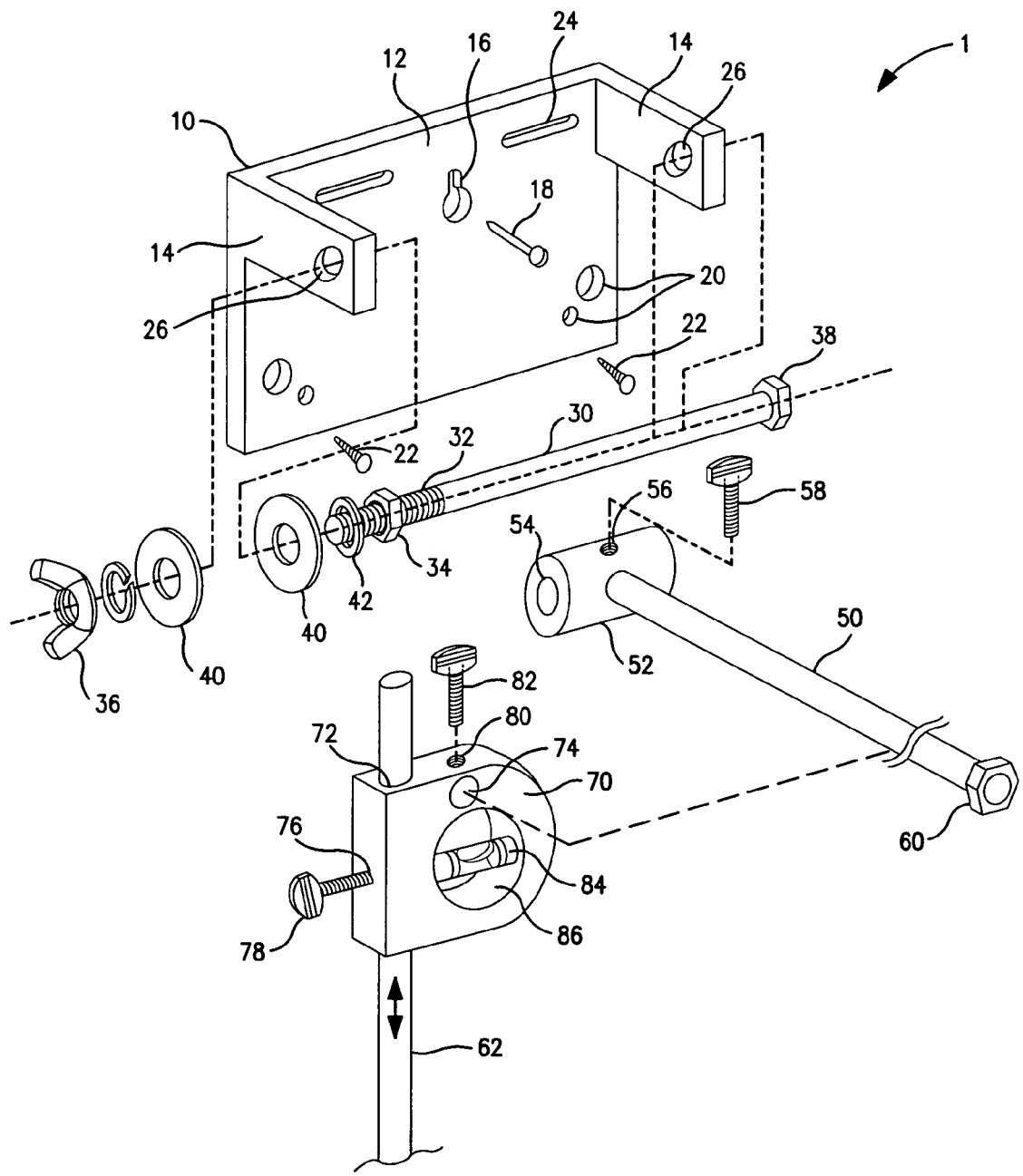
FIG. 2 is a perspective view of the components of the plumbing apparatus according to the invention.

Referring to FIGS. 1 and 2, a preferred embodiment of the invention of an apparatus 1 for plumbing control joints is shown in detail. For the purposes of the disclosure, the term "control joint" may include any type of joint within a wall, including expansion joints, seams, an edge, etc. Moreover, it should be understood that the invention could be used for any type of masonry wall, including brick, stone, composite, etc. A mounting bracket 10 includes a mounting plate 12 and two bracket arms 14 that extend perpendicularly from the mounting plate 12. Preferably the mounting bracket is constructed of metal and the bracket arms are fixed to the mounting plate by welding. Alternatively, the mounting bracket may be constructed from a single, or from multiple pieces of material, and any material may be used, e.g., metal, plastic, composite, etc. In FIG. 1 the mounting plate 12 is mounted to an exterior building structure, hereinafter referred to as surface A, against which bricks B are being laid. In a typical application, surface A may comprise a material such as plywood, particle board, sheet rock, etc. However, it should be understood that the invention can be configured to work with any type of wall surface, whether an exterior building structure or an interior wall such as a fireplace, including cinder blocks, cement, vinyl, etc. The mounting plate 12 is provided with a keyhole 16 which allows the plate to be hung on a nail 18 or screw in a generally horizontal manner, due to the placement of the keyhole 16 in the mounting plate 12 being generally centered above the center of gravity of the plate. Further more screw holes 20 are provided in the mounting plate 12 to receive screws 22 when it is desired to affix the mounting bracket 10 to the wall surface A. The screw holes 20 are shown in various sizes to accommodate wood nails and screws, sheet rock screws, concrete screws, etc. Elongated slots 24 are also provided in the mounting plate 12 to provide an alternate mounting means to accommodate the user's mounting needs, such as for instance if the user wishes to mount the mounting bracket in an angled or vertical manner, rather than horizontally as depicted. The bracket arms 14 are each provided with through holes 26 to be described hereinafter.

The invention includes a bracket rod 30 which is supported in the mounting bracket 12 by the bracket arms 14. The bracket rod 30 is slidably received in the through holes 26 provided in the bracket aims 14. A first end 32 of the bracket rod 30 is threaded to engage with threaded nut 34 and wing nut 36. A second end of the bracket rod 30 has a fixed nut 38 secured thereto. When the threaded end 32 of bracket rod 30 is received in a through hole 26, the threaded nut 34 is positioned on the threaded end 32 at a desired position. Washers 42 are provided on both sides of the bracket arm 14 and one or more spring washers 42 may be interposed adjacent to the washers 40 to take up any slack on the threaded end of the bracket rod 30 between the threaded nut 34 and wing nut 36, which is tightened on the end of the bracket rod.

An extension rod 50 is shown mounted in a fixed manner to a cylindrical collar 52. The extension rod 50 extends radially outward from the cylindrical collar 52. The cylindrical collar 52 has an axial through hole 54 through which the bracket rod 30 is slidably received. More particularly, the through hole 54 allows the collar 52 to slide axially along the bracket rod 30 and also to rotationally pivot about the bracket rod 30. The collar 52 is provided with a stopping mechanism comprised of a screw hole 56 which receives a thumb screw 58. The stopping mechanism stops or secures the collar 52 to the bracket rod when the extension rod is at the user's desired position. A free end of the extension rod 50 is provided with a fixed nut 60.

The invention further includes a plumb rod 62 and a plumb rod holding member 70. The plumb rod 62 is slidably received in a first through hole 72 provided in the holding member 70, as indicated by the arrow. The extension rod 50 is slidably received in a second through hole 74 provided in the holding member 70 and is retained therein by the fixed nut 60 at the end of the extension rod. The first through hole 72 extends perpendicularly to the second through hole 74 such that when assembled, as in FIG. 1, the plumb rod 62 is held by the holding member perpendicularly to the extension rod 50. The holding member has a first stopping mechanism comprising a first screw hole 76 and a first thumb screw 78 passing through the holding member to the first through hole 72. The first thumb screw 78 may be tightened against the plumb rod 62 to secure the plumb rod from sliding relative to the holding member. Similarly a second stopping mechanism comprising a second screw hole 80 and a second thumb screw 82 pass through the holding member to the second through hole 74. The second thumb screw 82 may be tightened against the extension rod 50 to secure the extension rod relative to the holding member. A spirit level 84 is fixed within a circular bore 86 of the holding member.

When the apparatus 1 is completely assembled, as in FIG. 1, the benefits of the apparatus according to the invention will be more fully understood. The keyhole 16 in the mounting plate allows the mounting bracket 10 to be quickly hung against the wall A. Accurate positing, for example the mounting bracket 10 being perfectly horizontal is not essential, as will be explained. Because the movable attachment of the collar 52 relative to the bracket rod 30 in a slidable and pivotable manner, the positioning of the plumb rod 62 can be greatly varied by relatively small changes of the position of the collar on the bracket rod. Furthermore, the plumb rod holding member 70 is pivotally and slidably mounted on the extension rod. Therefore, it will be understood that regardless of the orientation of the mounting plate against the wall, the plumb rod can be manipulated into virtually any desired position, whether it be plumb, as can be determined by the spirit level as oriented in the FIGS. 1-3, or angled as in FIG. 4, to be described hereinafter.

FIG. 1 demonstrates the apparatus according to the invention being utilized in a first application of a vertical control joint C. Bricks B are being laid against the wall A from the ground up. The plumbing apparatus 1 is used in this application to ensure that the control joint C is vertical or plumb to level ground. The mounting bracket 10 is attached to the wall surface A in a desired location by means of a hanging nail 18. Assuming the bracket rod 30 has been inserted through the bracket arms 14 by means of the through holes 26, the wing nut 36 is then tightened on the threaded end 32 of the bracket rod 30. The bracket rod 30, extension rod 50 and plumb rod 62 may be already loosely assembled by means of collar 52 and holding member 70 as described in detail previously. To ensure the control joint is plumb, first the lower end of the plumb rod 62 may be positioned in the control joint on the ground at the user's desired location. The collar 52 is then slid along the bracket rod 30 to position the plumb rod 62 adjacent to the bricks B in the control joint C. The vertical positioning of the plumb rod 62 is also adjustable due to the slidable engagement of the plumb rod in the through hole 72 of the holding member 70. When the desired vertical position of the plumb rod 62 is attained, the thumb screw 78 is tightened against the plumb rod 62. The distance of the plumb rod 62 from the wall surface A is adjusted by sliding the holding member 70 outward from the mounting bracket 10 along the extension rod 50 and then tightening the thumb screw 82 against the extension rod to secure the extended position of the holding member. To ensure the plumb rod is perpendicular to level ground, the holding member 70 is pivoted with respect to the extension rod 50 by means of sliding the collar 52 relative to the bracket rod 30, until the spirit level 84 indicates the desired result, at which time the thumb screw 58 is tightened to secure the collar 52 against the bracket rod 30 and the thumb screw 82 is tightened against the extension rod 50. At this time a plumb control joint is guaranteed by successively laying the brick layers against the plumb rod 62 in a manner which is typically known in the art.

Plumb rod 20 may be made from any material, such as steel, stainless steel, plastic, composite, etc. and be designed with any cross-section (e.g., circular, oval, rectangular, polygonal, etc.) and length. In an exemplary embodiment, the rod 20 comprises a ⅜ inch round cross-section and is about six feet in length. Generally, the size of the assembled apparatus 1 is approximately the size of a standard brick. It should be understood that any type of stopping mechanism that provides the feature of holding the plumb rod 62 in the holding member 70 may be used. As will be understood by those skilled in the art, the plumb rod 62 can be raised as necessary as the wall is erected, by unscrewing the bracket 10 from wall A, raising it, and re-fastening the bracket 10 to the wall at a higher position.

Figure 3:
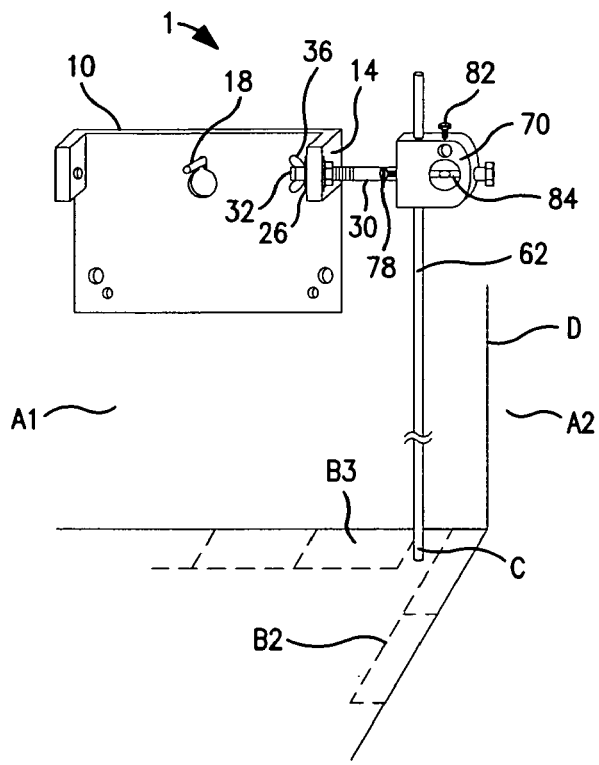
FIG. 3 is a perspective view of the plumbing apparatus being utilized in a second application.

Referring now to FIG. 3, a second application of the apparatus according to the invention is demonstrated in an inside corner control joint. Similarly, as described in the first application, bricks (B1 and B2, shown in phantom) are being laid against the walls A1 and A2, respectively from the ground up, but in this application in an inside corner D, where the two brick walls will meet generally at a right angle at control joint C, as depicted in FIG. 3. The plumbing apparatus 1 is used in this application to ensure that the control joint C is vertical or plumb to level ground as in the prior application. However, the method of using the apparatus for plumbing the control joint C is somewhat modified. The mounting bracket 10 is attached to the wall A in a desired location by means of a hanging nail 18. However, with the inside corner application, the bracket rod 30 is inserted through only the bracket arm 14 closest to the inside corner D by means of through hole 26. In this instance the positioning of the plumb rod 62 is constrained to a smaller work space, due to the inside corner D. Therefore it is desirable and advantageous to insert the bracket rod 30 through only the bracket arm 14 closest to the inside corner D. Alternatively, the mounting bracket 10 may be mounted vertically, (90 degree rotation relative that depicted in FIG. 3) to attain on even closer mounting of the mounting bracket toward the inside corner D, as it is understood from the prior description that multiple degrees of rotation of the plumb rod 62 relative to the mounting bracket are attainable. The wing nut 36 is then tightened on the threaded end 32 of the bracket rod 30. The bracket rod 30, extension rod 50 (not visible in FIG. 3) and plumb rod 62 may be already loosely assembled by means of collar 52 and holding member 70 as described in detail previously with reference to FIGS. 1 and 2. The collar 52 then slid along the bracket rod 30 to position the plumb rod 62 in adjacent to the a wall of bricks B1 (shown in phantom footprints) and adjacent to the bricks B2 (shown in phantom footprints) in the control joint C. Once the position of the lower end of the plumb rod is decided with respect to the walls A1 and A2, the distance of the plumb rod 62 from the wall A1 is adjusted by sliding the holding member 70 outward from the mounting bracket and wall A along the extension rod (not viewable in FIG. 3. To ensure the plumb rod 62 is perpendicular to level ground, the collar 52 may be adjusted along the bracket rod 30, until the spirit level 84 indicates the plumb rod is plumb, at which time the thumb screw 82 is tightened against the extension rod, and the thumb screw 58 is tightened against the bracket rod 30. At this time a plumb control joint is guaranteed by successively laying the brick layers against the plumb rod 62.

Figure 4:
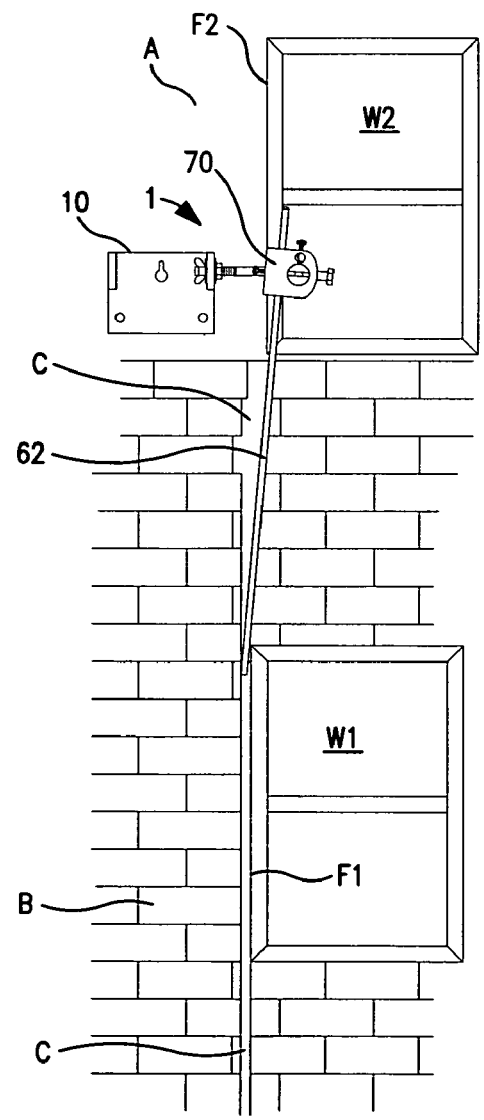
FIG. 4 is a front view the plumbing apparatus being utilized in a third application.

Referring now to FIG. 4, a third application of the apparatus 1 according to the invention is demonstrated for alignment of a control joint C between windows. In the instant application of the invention, windows of successive stories of a house or building are often misaligned. Typically, the vertical control joint in a brick wall of a multiple storied building is directly adjacent to and vertically aligned with the outer frames of vertically spaced windows. FIG. 4 simplistically depicts the aforementioned misalignment of vertically spaced windows W1, W2. A lower window W1, is located in this application closer to ground level. The control joint C near the ground level is plumb against the outer vertical frame F1 of the window W1. It can be seen that an upper window W2, spaced vertically above the lower window W1, has an outer frame F2 that is misaligned the outer frame F1 of the lower window W1. In this application when bricks are being laid against the wall surface A, it is difficult to determine the misalignment of the vertical control joint C between the windows W1, W2 until the brick layers have already been applied up to the upper window and the misaligned control joint thereof.

Once again, bricks B are being laid against a wall A from the ground up, but in this application in vertically misaligned windows have an angled control joint C therebetween, as depicted in FIG. 4. The plumbing apparatus 1 is used in this application to ensure that the control joint C is vertical or plumb to level ground as in the prior applications, but when the control joint is adjacent to a window, and then to gradually join the vertically misaligned control joints existing between vertically spaced windows to lay successive layers of bricks in a smooth and aesthetically pleasing manner between windows. The method of using the apparatus for guiding the control joint C and layering of bricks is somewhat modified. The mounting bracket 10 is attached to the wall A in a manner described previously and the use of the plumbing apparatus with reference to the lower window control joint C is as described in the first application. Because of the misalignment of the control joint between the windows W1, W2, and the need to align the plumb rod in close proximity to the windows, the bracket rod 30 may be inserted through only the bracket arm 14 closest to the outer frame F1, F2 of the respective lower and upper window by means of through hole 26. In this instance the positioning of the plumb rod 62 is constrained to a smaller work space, due to the presence of the windows, such that attaching the apparatus may be more difficult due to less work space. Therefore it is desirable and advantageous to insert the bracket rod 30 through only the bracket arm 14 closest to the window frame. The use of the plumbing apparatus with respect to plumbing the control joint adjacent to the lower window is essentially the same as in the second application, as the application is that of a vertical control joint, and as such needs not to be repeated. However, once bricks have been successively laid up to the top of the lower window W1, the bracket 10 is removed from the wall, moved to a position adjacent to the upper window W2, and then affixed thereto. At this time the apparatus is adjusted by means of positioning the collar, extension rod, and holding member to precisely position the upper end of the plumb rod in the control joint adjacent to the lower outer coiner of the upper window W2, and to position the lower end of the plumb rod in the control joint at the upper outer corner of the lower window W1, as depicted in FIG. 4. This will orient the plumb rod so that the misaligned control joints of the lower and upper windows can be gradually joined when the layers of bricks are laid successively from the top of the lower window W1 to the bottom of the upper window W2. A smoothly tapered scam will result in the wall along the angled control joint due to the plumb rod guiding the user to lay the bricks.

Figure 5A:
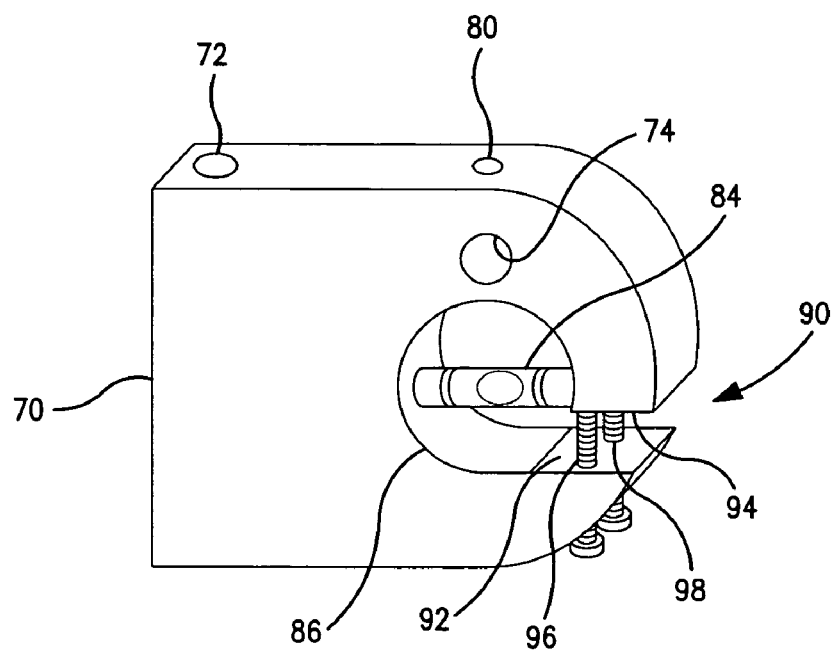
FIGS. 5A and 5B depict perspective views of the plumb rod holding member showing a calibration feature of the invention.
Figure 5B:
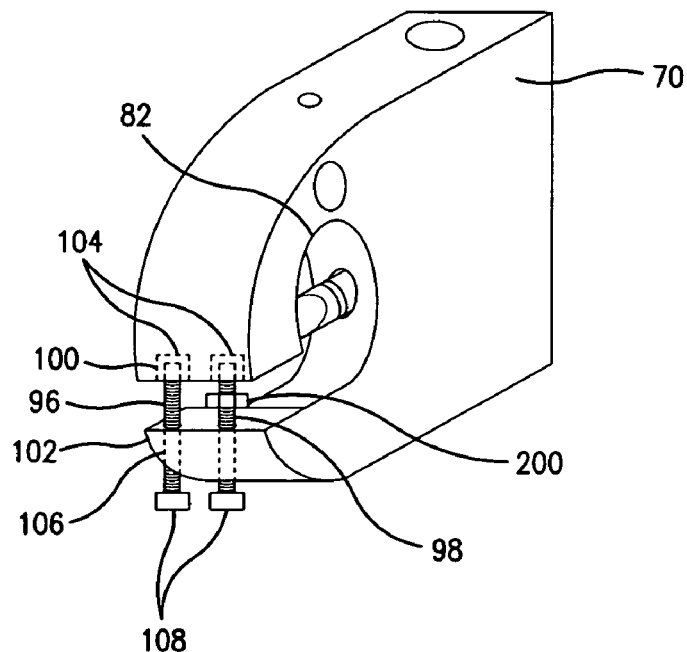

Referring now to FIGS. 5A and 5B, a calibration mechanism 90 according to the invention will be described. The plumb rod holding member 70 is shown with an additional feature which provides for calibration of the apparatus for plumbing control joints. The calibration mechanism 90 is provided in a "jaw" 92 or cut away section of the holding member 70. The jaw 92 is formed by removing a portion of the holding member which is cut away from the circular bore 86 through the holding member 70 at a lower portion thereof.

An adjusting gap 94 is shown as well as are two adjusting members or screws 96, 98. The upper 100 and lower 102 portions of the jaw 92 are provided with screw receiving holes 104, 106, respectively. Upper jaw portion 100 has threaded screw holes 104 which receive the ends of screws 96, 98, whereas lower jaw portion 102 has threaded screw holes 106 which pass through the lower jaw portion 102. The adjusting screws 96, 98 are provided with screw heads 108 which can be engaged by a screw driver or by a user's fingers to turn the respective adjusting screws 96, 98.

The first adjusting screw 96 is for tightening the gap 94 in the jaw 92, such that when the adjusting screw 96 is rotated, the screw 96 engaging the screw holes 104, 106, causes the upper jaw portion 100 and lower jaw portion 102 of the holding member 70 to be drawn closer to each other. This "tightening" of the gap 94 adjusts the position of the bubble in the spirit level 84. Alternatively, the second adjusting screw 98 is for spreading the gap 94 in the jaw 92. This adjusting screw 98 is provided with a stop 200 provided thereon which engages the adjusting screw 98 in a manner such that when the adjusting screw 98 is rotated, the screw 98 engaging the screw holes 104, 106, and the stop 200, causes the upper jaw portion 100 and lower jaw portion 102 of the holding member 70 to be spread apart from each other. This "spreading" of the gap 94 adjusts the position of the bubble in the spirit level 84. Because the placement of the adjustment screws, the relative positions of the plumb rod and the extension rod, can be adjusted, to compensate for machining tolerances, and thereby ensure a true ninety degree angle between the plumb rod and the spirit level. The adjustment provided by the adjustment screws 96, 98 allows for precise calibration of the apparatus. The calibration mechanism 90 described is an exemplary embodiment, and may be provided with an alternative adjusting member or members without departing from the spirit of the invention, as will be understood by those skilled in the art.

It will be appreciated that the spirit level may be fixed within the holding member at various other angles, or that a second spirit level may be incorporated into the holding member is there exists an application which would benefit therefrom. For instance if it were so desired, the holding member could be swapped out with another holding member having a spirit level which may be vertical of angled if the user has such a need during a particular application. As it will be understood that the plumb rod can be positioned horizontally, the plumbing apparatus described herein may prove to be useful as a horizontal alignment means. In such a case, the spirit level need only to be rotated by 90 degrees relative to the holding member. These and other modification will be appreciated by those skilled in the art in light of the disclosure of the invention.

The foregoing relates to preferred exemplary embodiments of the invention, it being understood that other variants and embodiments thereof are possible within the spirit and scope of the invention, the latter being defined by the appended claim.

I claim:

1. An apparatus for plumbing a control joint in a masonry wall comprising:
   a plumb rod;
   plumb rod holding means for holding the plumb rod in a desired position relative to a control joint in a wall;
   mounting means for mounting said plumb rod holding means to the wall; and
   plumbing means mounted to said plumb rod holding means for plumbing the plumb rod with respect to said desired position,
wherein said plumb rod holding means comprises adjusting means for adjusting the position of said plumb rod relative to said mounting means and securing means for securing the position of the plumb rod relative to said holding means, and
wherein said plumbing means is embodied as at least one spirit level being permanently mounted on said adjusting means,
   wherein said adjusting means is embodied by a first positioning mechanism connected between said mounting means and said plumb rod, said first positioning mechanism enabling horizontal adjustment of the plumb rod relative to said mounting means in a plane parallel to said mounting means, and a second positioning mechanism connected between said mounting means and said plumb rod said second positioning mechanism enabling pivotal adjustment of the plumb rod relative to said mounting means in the plane parallel to said mounting means, and
   wherein said first positioning mechanism is embodied by a mounting rod fixed horizontally with respect to said mounting means and a sliding collar slidingly engaged with the mounting rod.

2. An apparatus for plumbing a control joint in a masonry wall comprising:
   a plumb rod;
   plumb rod holding means for holding the plumb rod in a desired position relative to a control joint in a wall;
   mounting means for mounting said plumb rod holding means to the wall; and
   plumbing means mounted to said plumb rod holding means for plumbing the plumb rod with respect to said desired position,
wherein said plumb rod holding means comprises adjusting means for adjusting the position of said plumb rod relative to said mounting means and securing means for securing the position of the plumb rod relative to said holding means, and
wherein said plumbing means is embodied as at least one spirit level being permanently mounted on said adjusting means,
   wherein said adjusting means is embodied by a first positioning mechanism connected between said mounting means and said plumb rod, said first positioning mechanism enabling horizontal adjustment of the plumb rod relative to said mounting means in a plane parallel to said mounting means, and a second positioning mechanism connected between said mounting means and said plumb rod, said second positioning mechanism enabling pivotal adjustment of the plumb rod relative to said mounting means in the lane parallel to said mounting means, and
wherein said second positioning mechanism is embodied by an extension rod extending radially outward from said mounting means and a plumb rod holding member slidingly engaged with the extension rod, said spirit level being mounted on said plumb rod holding member.

3. An apparatus for plumbing a control joint in a masonry wall comprising:
   a plumb rod;
   plumb rod holding means for holding the plumb rod in a desired position relative to a control joint in a wall;
   mounting means for mounting said plumb rod holding means to the wall; and
   plumbing means mounted to said plumb rod holding means for plumbing the plumb rod with respect to said desired position,
wherein said plumb rod holding means comprises adjusting means for adjusting the position of said plumb rod relative to said mounting means and securing means for securing the position of the plumb rod relative to said holding means and wherein said plumbing means is embodied as at least one spirit level being permanently mounted on said adjusting means, wherein said adjusting means is embodied by a first positioning mechanism connected between said mounting means and said plumb rod, said first positioning mechanism enabling horizontal adjustment of the plumb rod relative to said mounting means in a plane parallel to said mounting means, and a second positioning mechanism connected between said mounting means and said plumb rod, said second positioning mechanism enabling pivotal adjustment of the plumb rod relative to said mounting means in the plane parallel to said mounting means, and wherein said first positioning mechanism is embodied by a mounting rod fixed horizontally to said mounting means and a sliding collar slidingly engaged with the mounting rod, and wherein said second positioning mechanism is embodied by an extension rod extending radially outward from said mounting means and a plumb rod holding member slidingly engaged with the extension rod, said spirit level being mounted on said plumb rod holding member.

* * * * *